Patented Nov. 19, 1935

2,021,497

UNITED STATES PATENT OFFICE 2,021,497

LEAD SALTS OF DINITROSALICYLIC ACID

Willi Brün, Krefeld, Germany, assignor to Remington Arms Company, Inc., a corporation of Delaware No Drawing. Application November 7, 1930, Serial No. 494,199

7 Claims. (Cl. 260—11)

This invention relates to the production of certain new and previously unknown chemical compounds and mixtures of compounds. These compounds are of an explosive character and either alone or in conjunction with other materials are useful as combustion or detonation initiators. The materials, however, are entirely new in themselves and the invention is not limited to any particular use thereof.

More specifically, the invention comprises the discovery of certain new salts of derivatives of salicylic acid, $C_6H_4OH$—$COOH$, and particularly, normal lead salts of dinitrosalicylic acid, $C_6H_2(NO_2)_2OH$—$COOH \cdot H_2O$. Dinitrosalicylic acid has been made hitherto and its preparation is outlined in Beilstein's "Lehrbuch der Organischen Chemie", 4th Edition, vol. 10, page 122.

The present invention contemplates the preparation of certain salts of dinitrosalicylic acid, particularly hitherto unknown lead salts, including the normal lead salt. It has been found that normal and even acidic lead salts of dinitrosalicylic acid are produced when a solution of a soluble salt of lead, such as lead nitrate, lead acetate, lead tartrate, etc., is added to a solution of dinitrosalicylic acid of the proper alkalinity. One specific example of the production of normal lead dinitrosalicylate is as follows:

2.46 grams dinitrosalicylic acid (.01 mol.) is dissolved in 20 c. c. of normal sodium hydroxide solution—(.02 mol.) and 125 c. c. of water, the mixture being heated during the process. This step of the process may result in the production of a sodium salt of the acid. This solution is slowly poured into a solution of 3.31 grams of lead nitrate—(.01 mol.) in 50 c. c. of water. A flocculent yellow precipitate in a yield of about 76% is formed immediately, said precipitate having the composition $C_7H_2O_7N_2Pb$, corresponding to the normal lead salt of dinitrosalicylic acid. Its formula may be written structurally as follows:

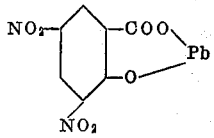

Both the analysis of this salt and the fact that it does not lose weight upon heating indicate that it does not contain water of crystallization. Other salts or mixtures of salts having a smaller lead content than the normal salt are secured when the proportions of the materials specified in the above example are varied in such a way as to decrease the alkalinity of the solution. If, for instance, the above specified sodium hydroxide-dinitrosalicylic acid ingredient is replaced by 4.92 grams (.02 mol.) dinitrosalicylic acid in 20 c. c. of normal sodium hydroxide solution, the lead nitrate solution remaining the same, the resulting precipitate, which is formed more slowly, contains only 36.4% of lead, whereas the normal salt contains 47.6% of lead. This lead content of the second material approaches that of a lead dinitrosalicylate of the composition $C_{14}H_6O_{14}N_4Pb$, which may be written structurally as follows:

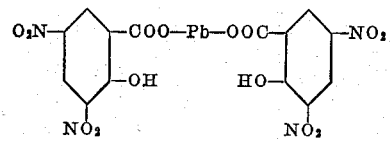

The theoretical lead content of this salt is 31.3%; thus, the material secured is probably a mixture thereof with the novel normal lead dinitrosalicylate. Other variations in the ingredients result in the formation of products of different lead content and varying characteristics. Thus the above salt seems to have been formed substantially pure when .02 mol. of dinitrosalicylic acid in .02 mol. hydroxide solution is treated with an excess, say about 50% excess of the theoretical quantity, of a soluble lead salt, such as lead nitrate, an analysis of the resulting precipitate shows a lead content of 28.1%.

The normal lead dinitrosalicylate has been found to have a sensitiveness to shock substantially equal to that of mercury fulminate; or about five times the sensitiveness of the basic lead salts, thus it constitutes a very desirable ingredient for priming and detonating compositions. However, both the normal salt and mixtures of lower lead content than the normal salt being entirely new, the present invention is not limited to any particular use thereof, and the appended claims are to be broadly construed.

What is claimed is:

1. The normal lead salt of disintrosalicylic acid.

2. A lead salt of dinitrosalicylic acid having a lead content not greater than fifty percent.

3. A composition of matter consisting of a mixture of the normal salt of dinitrosalicylic acid and salts thereof containing less lead than the normal salt.

4. A composition of matter consisting of a mixture of lead salts of dinitrosalicylic acid and having a lead content not greater than fifty percent.

5. The salt of dinitrosalicylic acid having the composition $C_{14}H_6O_{14}N_4Pb$.

6. The method of making a lead salt of dinitrosalicylic acid containing less lead than the normal salt which comprises the addition to molecular proportions of dinitrosalicylic acid and sodium hydroxide of an excess of lead nitrate.

7. The method of making a lead salt of dinitrosalicylic acid containing less lead than the normal salt which comprises the addition to molecular proportions of disintrosalicylic acid and sodium hydroxide of lead nitrate in a quantity approximately fifty per cent in excess of molecular proportions.

WILLI BRÜN.

CERTIFICATE OF CORRECTION.

Patent No. 2,021,497.                                                                        November 19, 1935.

WILLI BRÜN

It is hereby certified that error appears in the printed specification of the above numbered patent requiring correction as follows: Page 1, second column, line 46, claim 1, and page 2, second column, line 4, claim 7, for "disintrosalicylic" read dinitrosalicylic; and that the said Letters Patent should be read with these corrections therein that the same may conform to the record of the case in the Patent Office.

Signed and sealed this 7th day of January, A. D. 1936.

Leslie Frazer (Seal)                                                        Acting Commissioner of Patents.